M. F. WILLIAMS.
PULLEY.
APPLICATION FILED SEPT. 2, 1919.

1,334,511.

Patented Mar. 23, 1920.

Inventor
Milton F. Williams,
By H. M. Plaisted,
Attorney.

UNITED STATES PATENT OFFICE.

MILTON F. WILLIAMS, OF ST. LOUIS, MISSOURI.

PULLEY.

1,334,511.   Specification of Letters Patent.   Patented Mar. 23, 1920.

Application filed September 2, 1919.   Serial No. 321,144.

*To all whom it may concern:*

Be it known that I, MILTON F. WILLIAMS, a citizen of the United States, residing at St. Louis, State of Missouri, have invented certain new and useful Improvements in Pulleys, of which the following is a specification.

This invention relates to certain new and useful improvements in pulleys, the peculiarities of which will be hereinafter described and claimed.

The main object of my invention is the provision of means by which the air adhering to the inner face of the oncoming belt is largely deflected by opposing currents discharged from the center of the pulley through circumferential slots in the rim, is prevented from entering the sides of the pulley, and the balance of the approaching air passes into the open center of said pulley tends to be discharged in line with the receding belt.

Figure 1:
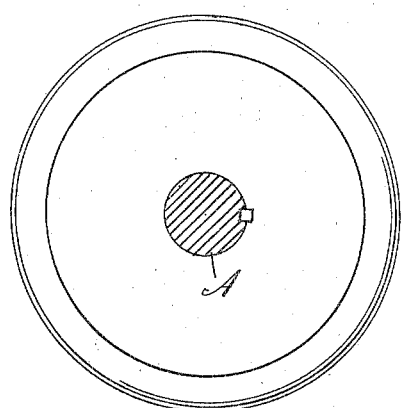
Figure 2:
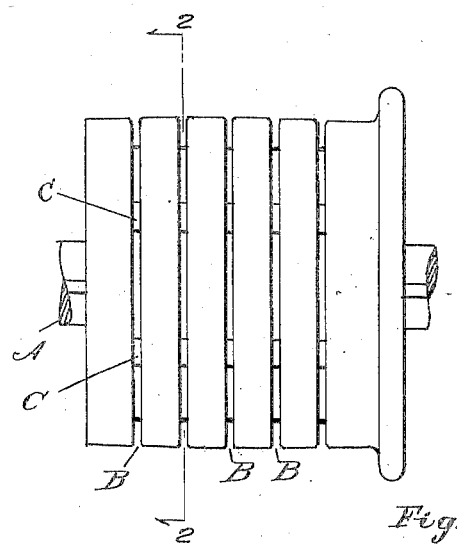
Figure 3:
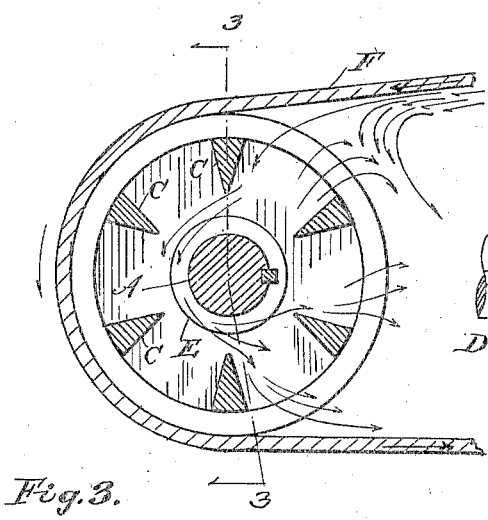

In the accompanying drawing on which like reference letters indicate corresponding parts, Figure 1 represents a side view of a pulley of my construction mounted on a shaft. Fig. 2 a face view of such a pulley; Fig. 3 a cross section of said pulley on the line 2—2 of Fig. 2; and Fig. 4 a longitudinal section of said pulley on the line 3—3 of Fig. 3.

Figure 4:
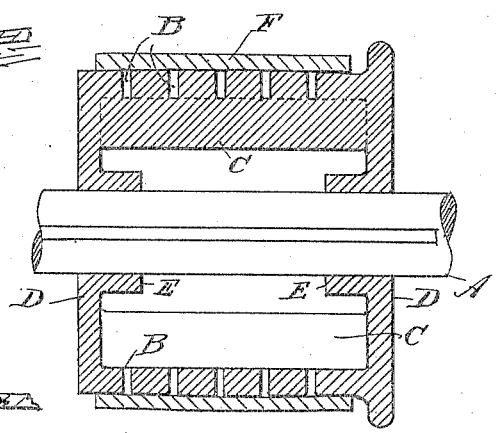

The letter A designates a shaft on which is mounted a pulley, the face of which is divided circumferentially by slots B extending through the rim of the pulley to the hollow center, and thus dividing the face into parallel rings. In order to support said rings I provide cross bars C engaging or integral with, the inner face of said rings and extending parallel to the shaft A, and substantially radial with the center of said shaft, but only part way to the shaft, so as to leave a central space within the pulley around the shaft. The bars are tapered inward as shown in Fig. 3 to a feather edge, and are widened outward to their engagement or contact with the inner face of said rings. These bars are supported by sides D—D having hubs E for the passage of the shaft, and closed to the entrance of outside air as shown in Fig. 3 and Fig. 4. A belt F running over said pulley as indicated in Fig. 3 will close said slots in the face for the portion of the circumference that the belt engages the pulley. The oncoming air on the inner side of the approaching belt, which ordinarily cushions the belt upon the pulley, will be met by the air currents driven out by the cross bars C which act as fan blades, and these belt currents will largely be overcome and deflected away from the pulley as indicated in Fig. 3. The balance of the air currents from the belt will be taken in through the slots B adjacent to the initial engagement of the belt with the pulley, and pass around the shaft in the open center of the pulley and be discharged at the opposite side of the pulley where the belt leaves the pulley, and in a direction parallel to such receding belt. Part of the air currents are carried around from the receding side of the belt toward the approaching side of the belt, and form the out-going currents from the pulley which counteract and deflect the oncoming opposing currents of air from the belt. This action equalizes the air pressure above and below the belt,—that is, from the outside of the belt to the inside of the belt,—and increases the adhesion of the belt to the pulley, and largely or wholly avoids any air cushioning of the belt upon the slotted rim face.

The inner edge of the bars, being substantially feather edge, prevent interference with the air currents circulating in the central space, and promote the discharge of said currents outward through the portion of the rim not covered by the belt. Thus the only means of entrance and exit for the air to the inner center of the pulley is through the circumferential slots, and the tendency of the bars C is to drive out any air that is admitted at the contact of the oncoming face of the belt with the pulley, and which is not deflected by these outgoing currents from the interior of the pulley.

I claim:

1. A pulley having circumferential slots through the rim forming rings, and cross bars connecting the inner faces of said rings and forming an open center for said pulley, substantially as described.

2. A pulley having circumferential slots through the rim forming rings, cross bars connecting the inner faces of said rings, and closed ends supporting the ends of said cross bars, substantially as described.

3. A hollow pulley having closed ends and a series of rings forming the rim and carried by a series of bars connecting said ends and the underside of said rings, and extending radially toward, but not meeting the shaft, and forming an open space,—the inner edge of said bars being substantially a feather edge, substantially as described.

In testimony whereof I have affixed my signature.

MILTON F. WILLIAMS.